(12) United States Patent
Vasudevalu et al.

(10) Patent No.: US 11,989,193 B2
(45) Date of Patent: May 21, 2024

(54) METHOD AND SYSTEM FOR MODIFYING SEARCH QUERY FOR A USER

(71) Applicant: SAMSUNG ELECTRONICS CO., LTD., Suwon-si (KR)

(72) Inventors: Pavani Ronur Vasudevalu, Bengaluru (IN); Vikram Mupparthi, Bengaluru (IN); Pinaki Bhaskar, Bengaluru (IN); Shilpa Gopinath, Bengaluru (IN); Pushkaraj Vinayak Shirvalkar, Bengaluru (IN); Mahesh Gorijala, Bengaluru (IN); Vignesh Lakshminarayanan, Bengaluru (IN); Himanshi Sinha, Bengaluru (IN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/857,783

(22) Filed: Jul. 5, 2022

(65) Prior Publication Data
US 2022/0414110 A1     Dec. 29, 2022

Related U.S. Application Data

(63) Continuation of application No. PCT/KR2022/006881, filed on May 13, 2022.

(30) Foreign Application Priority Data

Jun. 29, 2021  (IN) .............................. 202141029193
Jan. 13, 2022  (IN) .............................. 202141029193

(51) Int. Cl.
*G06F 16/2457*     (2019.01)
*G06F 16/242*      (2019.01)

(52) U.S. Cl.
CPC ...... *G06F 16/24578* (2019.01); *G06F 16/242* (2019.01)

(58) Field of Classification Search
CPC ............. G06F 16/24578; G06F 16/242; G06F 16/3338; G06F 16/335; G06F 16/9535
See application file for complete search history.

(56) References Cited

U.S. PATENT DOCUMENTS 9,178,933 B1   11/2015  Soland
9,965,559 B2    5/2018  Marcin et al.
(Continued)

FOREIGN PATENT DOCUMENTS

CN     111221983 A      6/2020
CN     111651675 A      9/2020
(Continued)

OTHER PUBLICATIONS

Hood, R., "Knowledge graphs applied in the retail industry", Towards Data Science, Jan. 8, 2020, 10 pages, https://towardsdatascience.com/knowledge-graphs-applied-in-the-retail-industry-ecac4e7baf8.

(Continued)

*Primary Examiner* — Jay A Morrison
(74) *Attorney, Agent, or Firm* — Sughrue Mion, PLLC

(57) ABSTRACT

A method and a modification system for modifying a search query for a user are provided. The method includes receiving at least one search query from a user; determining a present context of the user, based on the at least one search query and on-device data; identifying at least one relevant attribute related to the search query based on the present context of the user and a personalized knowledge graph, wherein the personalized knowledge graph is dynamically generated based on the on-device data; and modifying the search query, based on the at least one relevant attribute and a (Continued)

relation of the at least one relevant attribute with the search query, to obtain at least one modified search query.

13 Claims, 8 Drawing Sheets

(56) References Cited

U.S. PATENT DOCUMENTS

| | | |
|---|---|---|
| 9,998,472 B2 | 6/2018 | VerWeyst et al. |
| 10,691,685 B2 | 6/2020 | Verma et al. |
| 10,936,688 B2 | 3/2021 | Lu et al. |
| 11,281,724 B2 | 3/2022 | Song et al. |
| 11,288,574 B2 | 3/2022 | Gill et al. |
| 11,397,897 B2 | 7/2022 | Ameri |
| 2008/0028334 A1 | 1/2008 | De Mes |
| 2016/0267200 A1* | 9/2016 | Guo .................... G06F 3/0488 |
| 2018/0040020 A1* | 2/2018 | Kurian ................ G06F 16/951 |
| 2019/0251125 A1 | 8/2019 | Song et al. |
| 2019/0354604 A1 | 11/2019 | Filonov et al. |
| 2020/0050632 A1 | 2/2020 | Zhang et al. |
| 2020/0125967 A1* | 4/2020 | Seo ....................... G06N 20/00 |
| 2020/0301953 A1* | 9/2020 | Abhyankar ......... G06F 16/3328 |
| 2021/0216882 A1 | 7/2021 | Huang et al. |
| 2022/0409095 A1* | 12/2022 | Chuo ..................... G01H 11/08 |

FOREIGN PATENT DOCUMENTS

| | | |
|---|---|---|
| IN | 1782/CHE/2014 | 12/2015 |
| KR | 10-2007-0009095 A | 1/2007 |
| KR | 10-2018-0044481 A | 5/2018 |
| KR | 10-2021-0063859 A | 6/2021 |

OTHER PUBLICATIONS

International Search Report and Written Opinion (PCT/ISA/210, PCT/ISA/237) dated Aug. 23, 2022 by the International Searching Authority in International Application No. PCT/KR2022/006881.
Communication dated Feb. 15, 2023 by the Indian Patent Office in Indian Patent Application No. 202141029193.

* cited by examiner

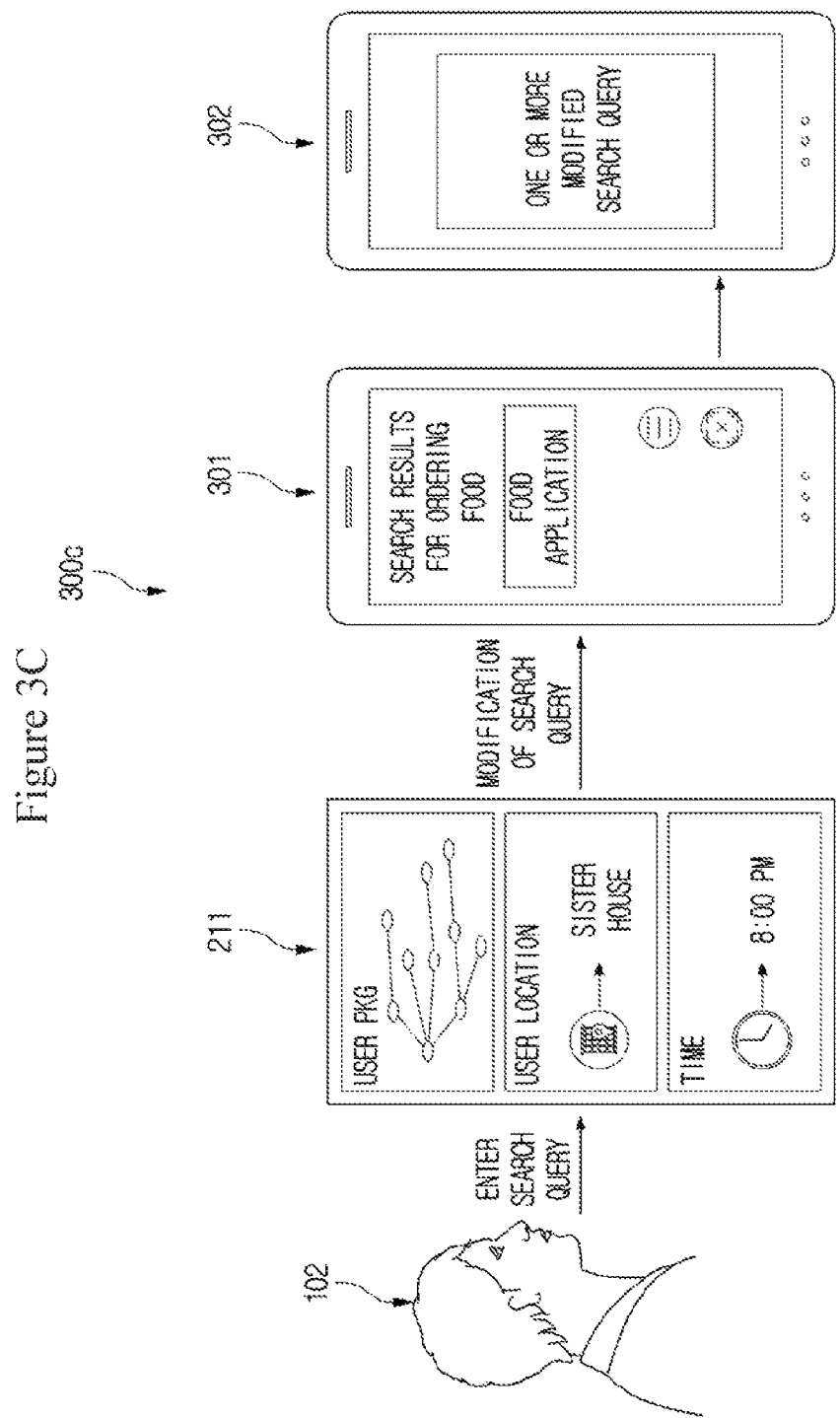

METHOD AND SYSTEM FOR MODIFYING SEARCH QUERY FOR A USER

CROSS-REFERENCE TO RELATED APPLICATION(S)

This application is a bypass continuation of International Application No. PCT/KR2022/006881, filed on May 13, 2022, which is based on and claims priority to Indian Patent Provisional Application No. 202141029193, filed Jun. 29, 2021, in the Indian Intellectual Property Office, and claims priority to Indian Patent Complete Application No. 202141029193, filed Jan. 13, 2022, in the Indian Intellectual Property Office, the disclosures of which are incorporated by reference herein in their entireties.

BACKGROUND

1. Field

The disclosure relates to query processing, and more particularly, to a method and system for modifying search query for a user.

2. Description of the Related Art

At present, users use different search mechanisms to find answers for their queries. Generally, when the user enters a query, results obtained for the query may not be as per user's context. For example, consider that the user wants to go for a dinner with his wife as it is her birthday. The user may enter a query "find a restaurant" on an application which is used for food. The application may show results to the user related to some restaurants near his location. However, the application may not be able to understand that the user wants to find a restaurant for having dinner and may fail to suggest some restaurants which may be preferred by the user's wife.

Currently, many applications and search mechanisms utilize past search history of the user and current context to understand the query entered by the user and thereby give better results. However, existing systems are unable to accurately understand preferences, relationships, and intent of the user based on the past search history and current context while providing search results for the query. Thus, there is a need for better understanding of the query entered by the user and personalizing the results for better experience.

The information disclosed in this background of the disclosure section is only for enhancement of understanding of the general background of the invention and should not be taken as an acknowledgement or any form of suggestion that this information forms the prior art already known to a person skilled in the art.

SUMMARY

According to an aspect of the disclosure, there is provided a method for modifying a search query for a user, the method including: receiving at least one search query from a user; determining a present context of the user, based on the at least one search query and on-device data; identifying at least one relevant attribute related to the search query based on the present context of the user and a personalized knowledge graph, wherein the personalized knowledge graph is dynamically generated based on the on-device data; and modifying the search query, based on the at least one relevant attribute and a relation of the at least one relevant attribute with the search query, to obtain at least one modified search query.

The method may further include: ranking the at least one modified search query, based on a relevance confidence determined for the at least one relevant attribute and the relation of each of the at least one relevant attribute associated with the at least one modified search query, wherein the relevance confidence is determined based on the present context of the user and the on-device data; and providing the at least one modified search query and at least one search result for the at least one modified search query to the user.

A plurality of modified search queries may be obtained, and the at least one search result may be related to a modified search query ranked highest among the plurality of modified search queries based at least in part on the relevance confidence.

The method may further include dynamically generating the personalized knowledge graph by: recording the on-device data over a period of time from a plurality of applications of the user; identifying at least one correlation among the on-device data from the plurality of applications; and generating the personalized knowledge graph based on the at least one correlation obtained among the on-device data.

The method may further include: detecting at least one new information from a device related to the user; and updating the dynamically generated personalized knowledge graph for each detection of the new information in the device.

The on-device data may include at least one of on-device sensor data, on-device settings of the user, user activity information, user event information, user contacts information, user application settings information, application sensor information, and current location information of user.

According to an aspect of the disclosure, there is provided a modification system for modifying a search query for a user, the modification system including: a memory storing instructions; a processor communicatively coupled to the memory and configured to execute the instructions to: receive at least one search query from a user; determine a present context of the user, based on the at least one search query and on-device data; identify at least one relevant attribute related to the at least one search query based on the present context of the user and a personalized knowledge graph, wherein the personalized knowledge graph is dynamically generated based on the on-device data; and modify the at least one search query, based on the at least one relevant attribute and a relation of the at least one relevant attribute with the at least one search query, to obtain at least one modified search query.

The processor may be further configured to execute the instructions to: rank the at least one modified search query, based on a relevance confidence determined for the at least one relevant attribute and the relation of each of the least one relevant attribute associated with the at least one modified search query, wherein the relevance confidence is determined based on the present context of the user and the on-device data; and provide the at least one modified search query and at least one search result for the at least one modified search query to the user.

A plurality of modified search queries may be obtained, and the at least one search result may be related to a modified search query ranked highest among the plurality of modified search queries based at least in part on the relevance confidence.

The processor may be further configured to execute the instructions to dynamically generate the personalized knowledge graph by: recording the on-device data over a period of time from a plurality of applications of the user; identifying at least one correlation among the on-device data from the plurality of applications; and generating the personalized knowledge graph based on the at least one correlation obtained among the on-device data.

The processor may be further configured to execute the instructions to: detect at least one new information from a device related to the user; and update the personalized knowledge graph for each detection of new information in the device.

The on-device data may include at least one of on-device sensor data, on-device settings of the user, user activity information, user event information, user contacts information, user application settings information, application sensor information, and current location information of user.

According to an aspect of the disclosure, there is provided an on-device search method for providing results for a search query for a user, the on-device search method including: receiving at least one search query from the user; determining a current context of the user, wherein the current context of the user includes at least one of an application activity, a location of the user, on-device sensor data, and on-device settings of the user; referring to a personalized knowledge graph to identify at least one relationship relevant to the search query, from among a plurality of relationships established between the current context of the user and a past context of the user; modifying the search query to include the identified relevant relationship; and providing results for the search query by applying the modified search query to a search.

The personalized knowledge graph may be generated using at least one of the past context of the user, past application activity, a past location of the user, past on-device sensor data, and past on-device settings of the user.

According to an aspect of the disclosure, there is provided a search method for providing results for a search query for a user, the search method including: receiving a search query from a user; identifying a current context of the search query, based on at least one of an application activity, a location of the user, on-device sensor data, and on-device settings of the user; extracting at least one entity from the search query, wherein the at least one entity includes at least one of a name, a tag, and a media; referring to a personalized knowledge graph to identify a relevant relationship between the at least one entity and the current context of the search query; extracting information related to the at least one entity based on the identified relevant relationship; generating at least one expanded search query based on the location, the current context, the extracted information related to the at least one entity, and the identified relationship; selecting the expanded search query having maximum relevance to the current context of the search query; and providing search results for the expanded search query.

The foregoing summary is illustrative only and is not intended to be in any way limiting. In addition to the illustrative aspects, embodiments, and features described above, further aspects, embodiments, and features will become apparent by reference to the drawings and the following detailed description.

One or more embodiments of the present disclosure provide a method for modifying the search query entered by the user for providing better results to the user by using the personalized knowledge graph for modification.

One or more embodiments of the present disclosure provide a method to better understand the search query and the present context of the user by using the on-device data and the personalized knowledge graph related to the user.

One or more embodiments of the present disclosure may improve performance of the device while providing search results to a search query by efficiently modifying the search query to understand intent of the user and providing relevant results for the search query.

BRIEF DESCRIPTION OF THE DRAWINGS

The above and other aspects, features, and advantages of certain embodiments of the present disclosure will be more apparent from the following description taken in conjunction with the accompanying drawings, in which:

FIGS. 3A, 3B and 3C show examples of modifying a search query for a user, in accordance with certain embodiments of present disclosure;

DETAILED DESCRIPTION

Figure 1:
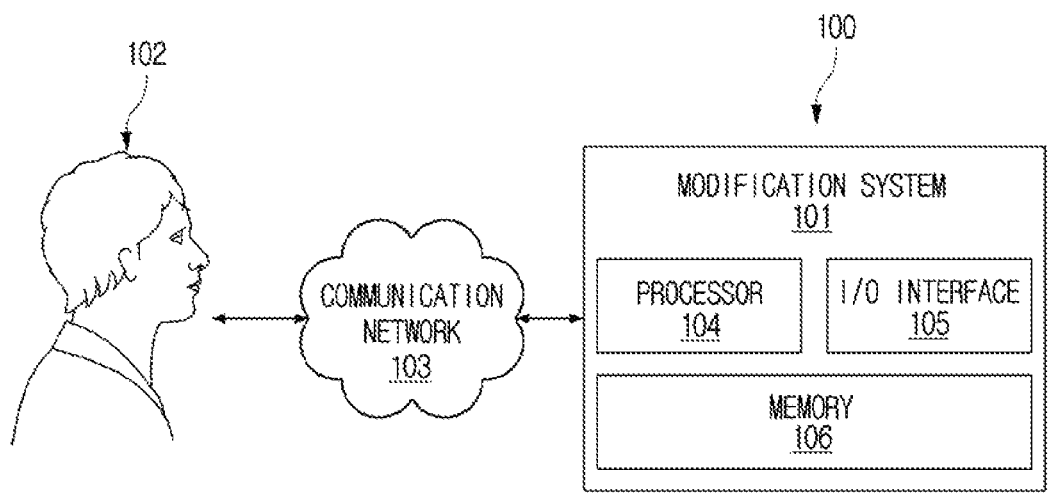
FIG. 1 illustrates an example environment for modifying a search query for a user, in accordance with certain embodiments of the present disclosure.

While embodiments of the disclosure may include to various modifications and alternative forms, specific embodiments thereof are shown by way of example in the drawings and will be described in detail below. It should be understood, however, that it is not intended to limit the disclosure to the forms disclosed, but on the contrary, the disclosure is to cover all modifications, equivalents, and alternative falling within the spirit and the scope of the disclosure.

It should be appreciated by those skilled in the art that any block diagrams of the drawings represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and executed by a computer or processor, whether such computer or processor is explicitly shown.

The terms "comprises," "comprising," "includes," "including," or any other variations thereof, are intended to cover a non-exclusive inclusion, such that a setup, device, or method that comprises a list of components or steps does not include only those components or steps but may include other components or steps not expressly listed or inherent to such setup or device or method. In other words, one or more elements in a system or apparatus proceeded by "comprises . . . a" or "includes . . . a" does not, without more constraints, preclude the existence of other elements or additional elements in the system or method.

In the following detailed description of the embodiments of the disclosure, reference is made to the accompanying drawings that form a part hereof, and in which are shown by way of illustration specific embodiments in which the disclosure may be practiced. These embodiments are described in sufficient detail to enable those skilled in the art to practice the disclosure, and it is to be understood that other embodiments may be utilized and that changes may be made without departing from the scope of the present disclosure. The following description is, therefore, not to be taken in a limiting sense.

Present disclosure relates to a method and modification system for modifying a search query for a user. The modification system is configured to receive a search query from a user to provide relevant search results for the search query. The search query is analyzed by identifying a context of the user. Upon identifying the context, information related to multiple applications used by the user is utilized and a relation of the information with the context of the user is identified. As a result, the search query may be modified, and optimal search results based on the modified search query is provided to the user. Thus, the present disclosure efficiently expands the search query and provides relevant results to the user.

FIG. 1 illustrates an example environment 100 for modifying a search query for a user, according to embodiments of the disclosure. The environment 100 includes a modification system 101, a user 102, and a communication network 103. In an embodiment, the modification system 101 may be implemented in a device associated with the user 102 such as, a laptop computer, a desktop computer, a personal computer (PC), a notebook, a smartphone, a tablet, e-book readers, a server, a network server, a cloud-based server, and the like. In an embodiment, the user 102 may interact with the modification system 101 via a User Interface (UI) of the device. The modification system 101 modifies the entered search query to provide better search results and user experience to the user 102.

In an embodiment, the modification system 101 may communicate with the user 102 via the communication network 103. In an embodiment, the communication network 103 may include, without limitation, a direct interconnection, a local area network (LAN), a wide area network (WAN), a controller area network (CAN), a wireless network (e.g., using Wireless Application Protocol), the Internet, and the like. The modification system 101 may be in communication with the user 102 for providing one or more results for one or more modified search queries.

The modification system 101 may receive a search query entered by the user 102. Upon receiving the query, the modification system 101 may determine present context of the user 102 based on the search query and on-device data.

In an embodiment, the on-device data may be data related to the device associated with the user 102, such as the mobile phone, or applications used by the user 102 in the device. In an embodiment, the on-device data may include, but is not limited to, sensor data, settings in the device, activity information, event information, contacts information, application settings information, application sensor information, current location of the user 102, and so on. In an embodiment, the sensor data may include, but is not limited to, data related to motion, location, environment around the user 102, and so on. In an embodiment, the settings in the device may include, but are not limited to, settings of applications to customize the device. In an embodiment, the activity information may include, but is not limited to, activities of the user 102 for the day such as shopping, office time, movie, and so on. In an embodiment, the event information may include, but is not limited to, information retrieved from calendar application such as, office meeting, birthdays and so on. In an embodiment, the contacts information may include, but is not limited to, contact numbers of various people associated with the user 102. In an embodiment, the application settings information and the application sensor information may include, but is not limited to, information related to the applications such as, type of games played by the user 102, number and type of applications used by the user 102 and so on.

In an embodiment, the current location of the user 102 indicates a location where the user 102 is present at an instance of time. Further, upon determining the present context of the user 102, the modification system 101 may identify one or more relevant attributes and a relation of each of the one or more relevant attributes with the entered search query. The one or more relevant attributes and relation of each of the one or more relevant attributes is obtained based on the present context of the user 102 and a Personalized Knowledge Graph (PKG). In an embodiment, the PKG is dynamically generated based on the on-device data. In an embodiment, the PKG is a graph indicating relationship of the on-device data with each other and with the entered search query.

The modification system 101 may record the on-device data over a period of time from a plurality of applications of the user 102. For example, consider that the user 102 may use a number of applications such as application for ordering food, application for booking movie tickets and so on. The modification system 101 may record information related to what kind of food the user 102 likes, or which type of movies the user 102 prefers, and so on. Upon such recording, the modification system 101 may identify one or more correlations among the on-device data from the plurality of applications. For example, the modification system 101 may identify that the user 102 often orders food after watching a movie, or the user 102 prefers watching comedy movies and so on. Thus, the modification system 101 may generate the PKG based on the one or more correlations obtained among the on-device data.

In an embodiment, the modification system 101 may detect new information from the device related to the user 102. For example, consider when a new contact number is added to a phone book application of the user 102. Upon detecting the new information, the modification system 101 may update the dynamically generated PKG for every new information which is detected in the device associated with the user 102.

Thereafter, the modification system 101 modifies the entered search query based on the PKG to obtain one or more modified search queries. For example, the entered search query may be "search for theatres near me," which the modification system 101 may modify as "search for theatres near me having movies of Siddharth Malhotra" or "search for theatres near me having comedy movies" and so on.

Further, the modification system 101 may include a processor 104, I/O interface 105, and a memory 106. In some embodiments, the memory 106 may be communicatively coupled to the processor 104. The memory 106 stores instructions, executable by the processor 104, which, on execution, may cause the modification system 101 to modify the search query for the user 102, as disclosed in the present disclosure. In an embodiment, the modification system 101 may be a dedicated server implemented inside the device. In another embodiment, the modification system 101 may be a cloud-based server.

In an embodiment, the modification system 101 may be associated with multiple devices associated with the user. In such an embodiment, the modification system 101 may communicate with each of the multiple devices to modify the search query provided by the user 102 associated with respective devices.

Further, upon modifying the entered search query, the modification system 101 may rank the one or more modified search queries. The one or more modified search queries are ranked based on a relevance confidence. The relevance confidence is assigned to the one or more relevant attributes and the relation of each of the one or more relevant attributes associated with the one or more modified search queries.

In an embodiment, the relevance confidence may be computed based on the present context of the user 102 and the on-device data. As described above in a previous example based on the generated PKG, the modification system 101 identifies that the present context of the user 102 is to watch comedy movies. Accordingly, based on the present context of the user 102, the modification system 101 may assign the relevance confidence to the one or more modified search queries. For instance, since the context of the user 102 is to watch comedy movies, one of the one or more modified search queries such as "search for theatres near me having movies of Siddharth Malhotra" may be assigned a lower relevance confidence of 0.5 and the other modified search query such as "search for theatres near me having comedy movies" may be assigned a higher relevance confidence of 0.8. Accordingly, the modified search query with the relevance confidence 0.8 is ranked first and the modified search query with the relevance confidence 0.5 is ranked second.

Upon ranking, the modification system 101 may provide at least one of the one or more modified search queries and one or more search results for at least one of the one or more modified search queries to the user 102. The one or more search results are related to one of the one or more modified search queries which is ranked highest based on the relevance confidence. For example, considering the above scenario, the user 102 may be provided with the one or more search results showing theatres having comedy movies, corresponding to the modified search query "search for theatres near me having comedy movies" which has the highest relevance confidence.

Figure 2:
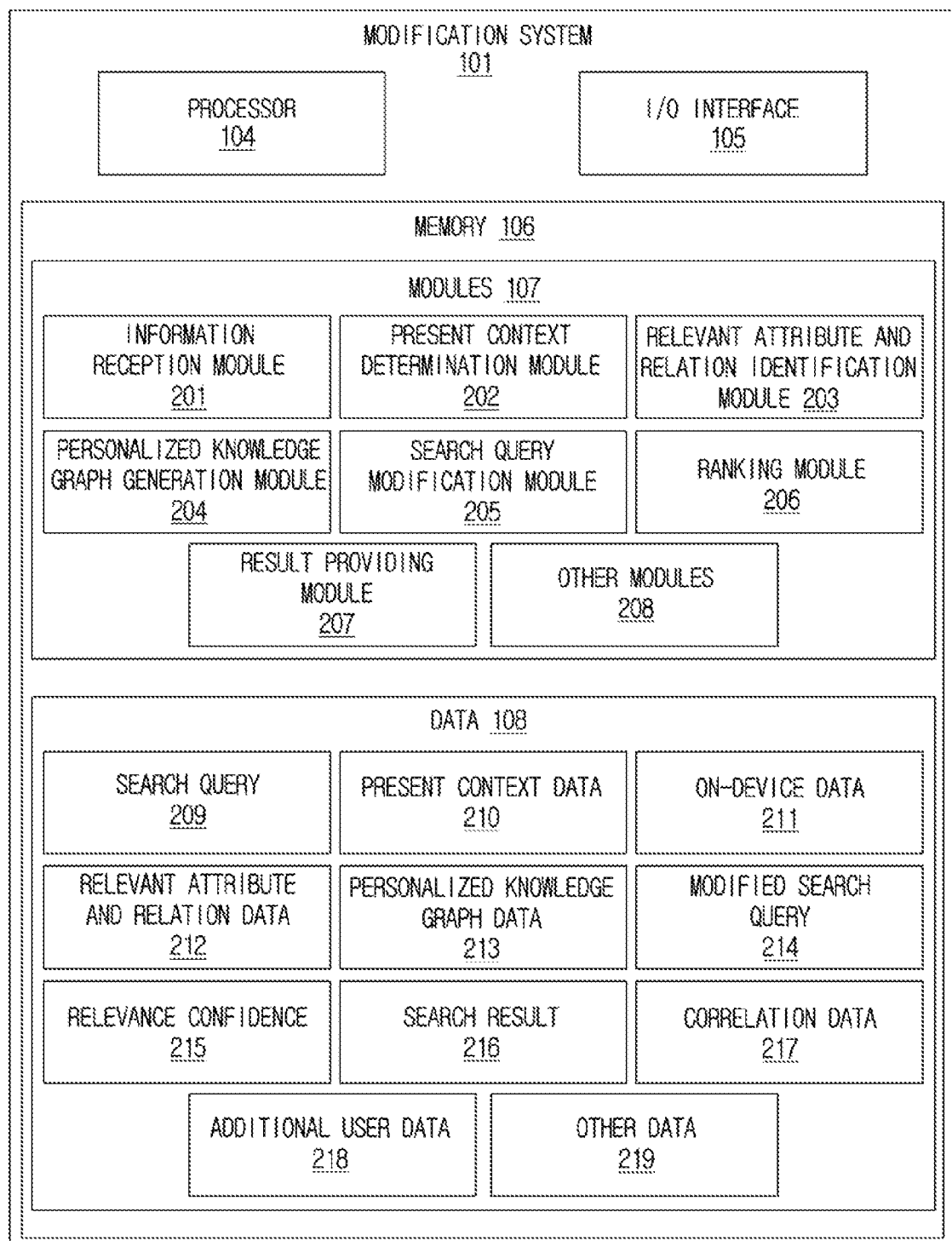
FIG. 2 illustrates a block diagram of a modification system for modifying a search query for a user, in accordance with certain embodiments of the present disclosure.

FIG. 2 shows a block diagram of a modification system 101 for modifying a search query for a user 102, in accordance with some embodiments of the present disclosure.

Data 108 and one or more modules in the memory 106 of the modification system 101 are described herein in detail.

In one implementation, the one or more modules 107 may include, but are not limited to, an information reception module 201, a present context determination module 202, an attribute and relation identification module 203, a personalized knowledge graph generation module 204, a search query modification module 205, a ranking module 206, a result providing module 207, and one or more other modules 208, associated with the modification system 101.

In an embodiment, the data 108 in the memory 106 may include search query 209, present context data 210, on-device data 211, attribute and relation data 212, personalized knowledge graph data 213, modified search query 214, relevance confidence data 215, search result 216, correlation data 217, additional user data 218, and other data 219 associated with the modification system 101.

In an embodiment, the data 108 in the memory 106 may be processed by the one or more modules 107 of the modification system 101. The one or more modules 107 may be configured to perform the steps of the present disclosure for modifying the search query for the user 102, using the data 108. In an embodiment, each of the one or more modules 107 may be a hardware unit which may be outside the memory 106 and coupled with the modification system 101. In an embodiment, the one or more modules 107 may be implemented as dedicated units and when implemented in such a manner, said modules may be configured with the functionality defined in the present disclosure to result in a novel hardware. As used herein, the term module may refer to an Application Specific Integrated Circuit (ASIC), an electronic circuit, a Field-Programmable Gate Arrays (FPGA), Programmable System-on-Chip (PSoC), a combinational logic circuit, software code executing on a processor, and/or other suitable components that provide the described functionality.

One or more modules 107 of the modification system 101 function to modify the search query for the user 102. Also, the one or more modules 107 of the modification system 101 function to provides one or more search results for the modified search query. The one or more modules 107, along with the data 108, may be implemented in any system for modifying the search query and providing the one or more search results for the user 102.

The search query 209 may include details about the user's query for which one or more search results is to be provided.

The present context data 210 may include information related to the intent of the user 102 based on the search query 209 and relation of the search query 209 with the on-device data 211.

The on-device data 211 may include information related to, but not limited to, sensor data, settings of the device, activity information, event information, contacts information, application settings information, application sensor information, current location of the user 102, and so on.

The attribute and relation data 212 may include information related to the on-device data 211 and a relation of the on-device data 211 with the search query 209.

The personalized knowledge graph data 213 may include details about how the on-device data 211 are connected to each other and with the search query 209.

The modified search query 214 may include one or more modified search queries related to the search query 209. The modified search query 214 may be modified based on the attribute and relation data 212.

The relevance confidence data 215 may include details about how relevant the modified search query 214 is to the search query 209 based on the present context data 210.

The search result 216 may include one or more search results for the modified search query 214.

The correlation data 217 may include information regarding how the on-device data 211 are linked to each other.

The additional user data 218 may include details about new information related to the user 102.

The other data 219 may store data, including temporary data and temporary files, generated by modules for performing the various functions of the modification system 101.

The information reception module 201 may be configured to receive a search query as input. The search query may be a voice query, or a written query entered by the user 102.

Figure 3A:
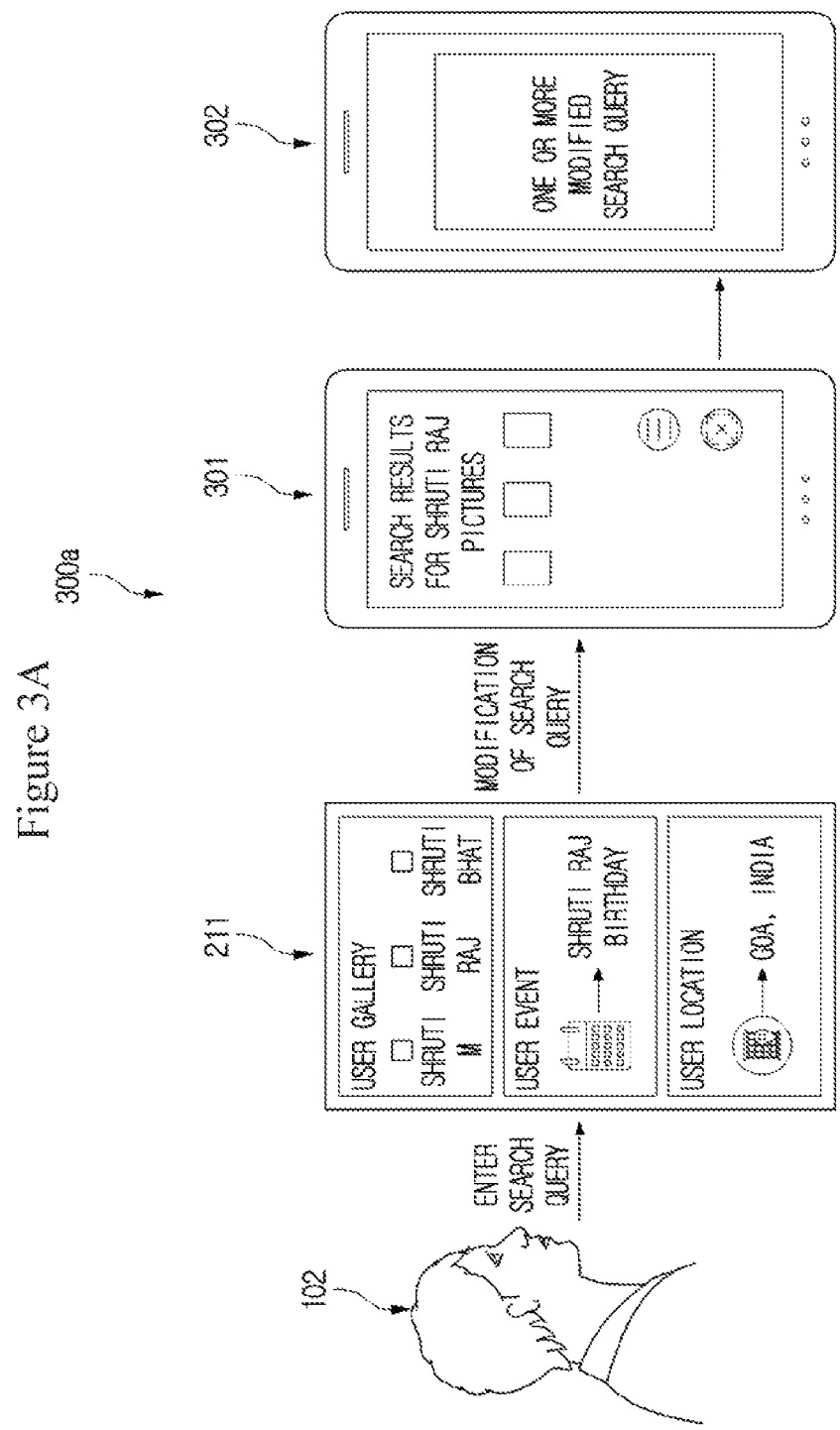

For example, FIG. 3A shows an example of modifying the search query for a user, in accordance with certain embodiments of present disclosure. The embodiment indicates the user 102, on-device data 211, first page of User Interface (UI) 301, and second page of UI 302. The user 102 enters the search query such as "show pictures of Shruthi" as input. Upon receiving the search query, the present context determination module 202 may determine a present context of the user 102 based on the search query and the on-device data 211. In an embodiment, the search query indicates that the user 102 wants to see pictures of a person named Shruthi. The on-device data 211 includes information related to a user gallery, information related to a user event, and a location of the user 102. The user gallery may include pictures of more than one person named Shruthi, such as Shruthi M, Shruthi Raj, Shruthi Bhat, and so on. The user event, which may be stored on a calendar of the user 102, may indicate a birthday of the person named Shurthi Raj. The location of the user 102 may indicate that the user 102 is in Goa, India.

Upon determining the present context of the user 102, the relevant attribute and relation identification module 203 may be configured to identify one or more relevant attributes and relation of the one or more relevant attributes with the search query. In an embodiment, the one or more relevant attributes and relation are identified based on the present context of the user 102 and a personalized knowledge graph.

The personalized knowledge graph is dynamically generated by the personalized knowledge graph generation module 204 based on the on-device data 211. For example, based on the on-device data 211 indicated in FIG. 3A, the personalized knowledge graph generation module 204 may be configured to dynamically generate the personalized knowledge graph based on the on-device data 211.

The personalized knowledge graph generation module 204 may be configured to record the on-device data 211 over a period of time from the plurality of applications of the user 102. For example, in FIG. 3A, the plurality of applications used by the user 102 may be gallery of the user 102, calendar of the user 102, and location application used by the user 102. Upon recording the on-device data 211, the personalized knowledge graph generation module 204 may be configured to identify one or more correlations among the on-device data 211 from the plurality of applications. For example, in FIG. 3A, the one or more correlations among the on-device data 211 may be that one of the persons named Shurthi has her birthday which is noted in the calendar of the user 102. The identified correlation is used by the personalized knowledge graph generation module 204 to generate the personalized knowledge graph.

In an embodiment, the personalized knowledge graph generation module 204 may be configured to detect a new information from a device related to the user 102. The new information may be, but is not limited to, a new picture, a new contact number, a new event in the calendar, and so on. For example, consider that the user 102 added a new event such as "Shruthi Raj birthday" in the calendar. The additional user data 218 may be detected and the personalized knowledge graph generation module 204 may be configured to update the personalized knowledge graph with the additional user data 218. Further, the relevant attribute and relation identification module 203 identifies a relation between the search query and the one or more relevant attributes. For example, in FIG. 3A, the one or more relevant attributes may be that the user 102 may be intending to see pictures of Shruthi Raj since it is her birthday as indicated in the calendar of the user 102.

Upon identifying the relation between the search query and the relevant attribute and relation data 212, the search query modification module 205 may be configured to modify the search query to obtain one or more modified search queries. The modification module 205 modifies the search query by expanding the search query using the identified relation between the search query and the relevant attributes. For example, the search query "show pictures of Shruthi" may be modified as "Show Shruthi Raj pictures". In another embodiment, the search query 209 may also be modified as "show Shruthi Bhat pictures" or "show Shruthi Raj birthday pictures" or "show Shruthi M pictures". In an embodiment, the one or more modified search queries may be referred as the modified search query 214 and stored in the memory 106.

Further, upon modification of the search query, the ranking module 206 may be configured to rank the one or more modified search queries based on a relevance confidence. In an embodiment, the relevance confidence is computed based on the present context of the user 102 and the on-device data 211. For example, in FIG. 3A, the modified search query "Show Shruthi Raj pictures" may have a relevance confidence of 0.8, as the modified search query is more relevant to the search query entered by the user 102 due to the on-device data 211 of the user 102. In an embodiment, one of the one or more modified search query "show Shruthi Bhat pictures" may have a relevance confidence of 0.4, as it may be less relevant to the search query. In an embodiment, one of the one or more modified search query "show Shruthi Raj birthday pictures" may have a relevance confidence of 0.7, as it may be moderately relevant to the search query. In an embodiment, one of the one or more modified search query "show Shruthi M pictures" may have a relevance confidence of 0.5, as it may be less relevant to the search query. Further, based on the relevance confidence, the ranking module 206 may rank the modified search query with maximum relevance confidence as a highest ranked modified search query.

Upon ranking the modified search query, the result providing module 207 may be configured to provide one or more search results for the modified search query having the maximum relevance confidence. For example, the modified search query "Show Shruthi Raj pictures" has the maximum relevance confidence, and thus the result providing module 207 shows pictures of Shruthi Raj to the user 102.

In an embodiment, the result providing module 207 may also be configured to provide options to the user 102 for selecting other modified search queries and obtaining results for the other modified search queries. In an embodiment, the other modified search queries may include, but is not limited to, a modified query based on relevance, a modified query based on location, a modified query based on context of the user 102, a modified query based on the on-device data 211, and so on. In an embodiment, the one or more search results may be referred as the search result 216 and is stored in the memory 106.

Figure 3B:
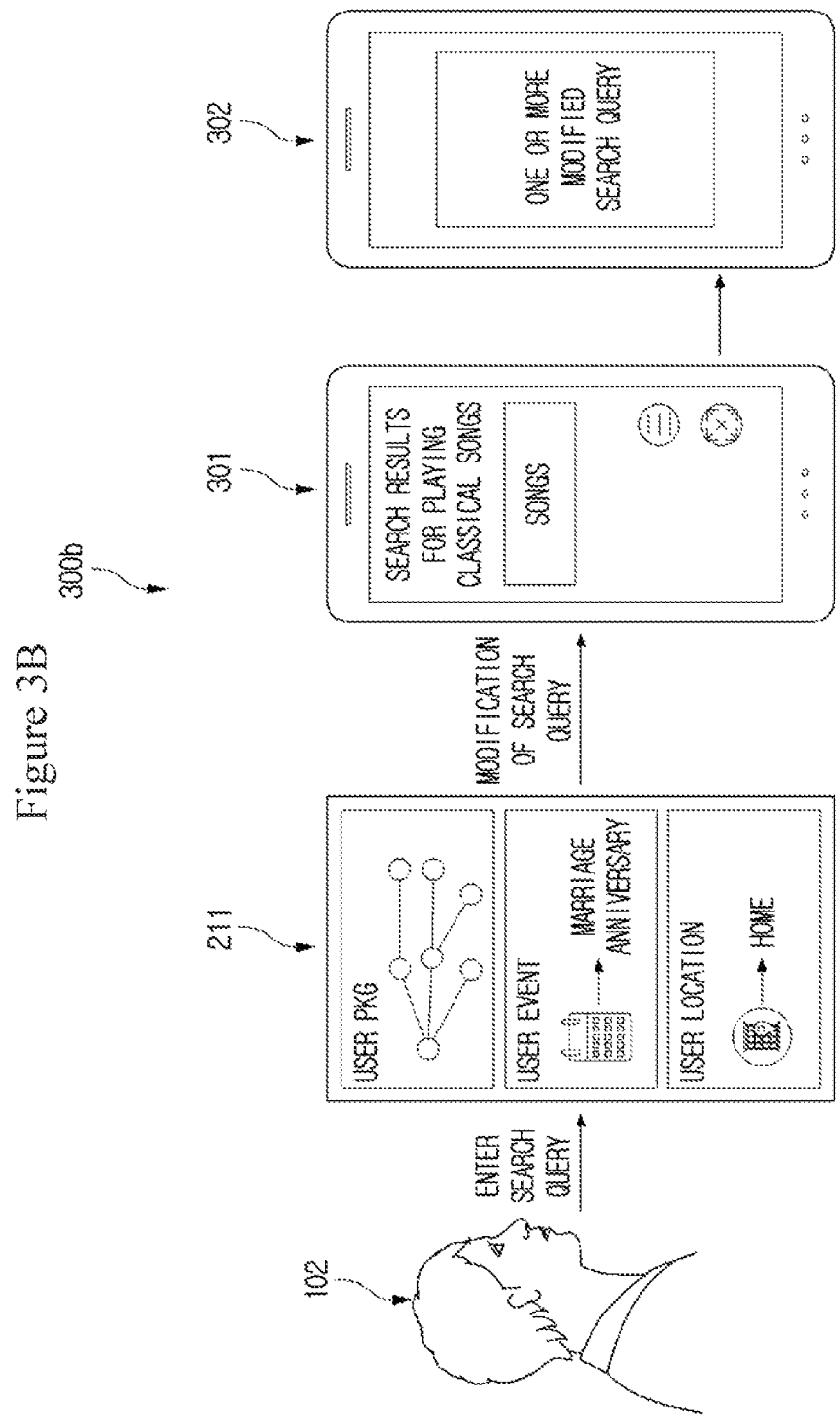

Similarly, FIG. 3B shows an example of modifying a search query for a user, in accordance with certain embodiments of present disclosure. In FIG. 3B, the user 102 enters a search query such as "play songs". The search query is modified based on the on-device data 211. The on-device data 211 may include the personalized knowledge graph, the user event, and the location of the user 102. In an embodiment, the personalized knowledge graph may include, but is not limited to, information related to the user 102, information regarding family members of the user 102, official information related to the user 102, and so on.

For example, in FIG. 3B, the personalized knowledge graph provides information about what songs the user 102 likes, information related to the user's wife and type of songs liked by her, and so on. The user event may indicate that it is a wedding anniversary of the user 102. Further, a location of the user 102 may indicate that the user 102 is at home.

Further, based on the on-device data 211, the search query may be modified to include information from the personalized knowledge graph to expand the search query. For example, in FIG. 3B, the search query may be "play songs" which may be modified as "play Hindi songs" as the user's wife likes Hindi songs. The search query may also be modified as "play Hindi retro", or "play folk music" or "play anniversary songs" and referred as the modified search query 214.

The modified search query 214 may be ranked based on relevance of the modified search query 214 with the search query entered by the user 102. In an embodiment, the user 102 may also select one of the modified search queries if a search result of the highest ranked modified search query 214 is not preferred by the user 102.

Similarly, FIG. 3C shows an example of modifying search query for a user, in accordance with some embodiments of present disclosure. In FIG. 3C, the user 102 enters a search query such as "order pasta". The search query is modified based on the on-device data 211. The on-device data 211 may include the personalized knowledge graph, the location of the user 102, and current timing of day. In an embodiment, the personalized knowledge graph may include, but is not limited to, information related to the user 102, information regarding family members of the user 102, information related to one or more applications used by the user 102, and so on.

For example, in FIG. 3C, the personalized knowledge graph provides information about a number of vouchers available with the user 102, which application(s) the user 102 often uses to order food, a number of people at the location of the user 102, and so on. The location of the user 102 may indicate that the user 102 at present is at their sister's house. Based on the location of the user 102, the personalized knowledge graph may be updated with the number of people in the user 102 sister's house. For example, the sister's house may include three people. In an embodiment, the current timing of day may indicate it is 8 pm.

Further, based on the on-device data 211, the search query may be modified to expand the search query to include information from the personalized knowledge. For example, in FIG. 3C, the search query may be "order pasta" which may be modified as "order four pasta entrees from abc food application" as there are four people at the location of the user 102. In another embodiment, the search query may also be modified as "order four pasta entrees from lmn food application", or "order three pasta entrees and one order of fries from xyz food application" and may be referred as the modified search query 214. The modified search query 214 may be ranked based on relevance of the modified search query 214 with the search query entered by the user 102.

In an embodiment, the user 102 may also select any one of the modified search queries if a search result of the highest ranked modified search query 214 is not preferred by the user 102. In an embodiment, the user 102 may also be given an option of increasing or reducing a number of quantities of food to be ordered.

The one or more modules 107 may also include other modules 208 to perform various miscellaneous functionalities of the modification system 101. It will be appreciated that such modules may be represented as a single module or a combination of different modules.

Figure 4:
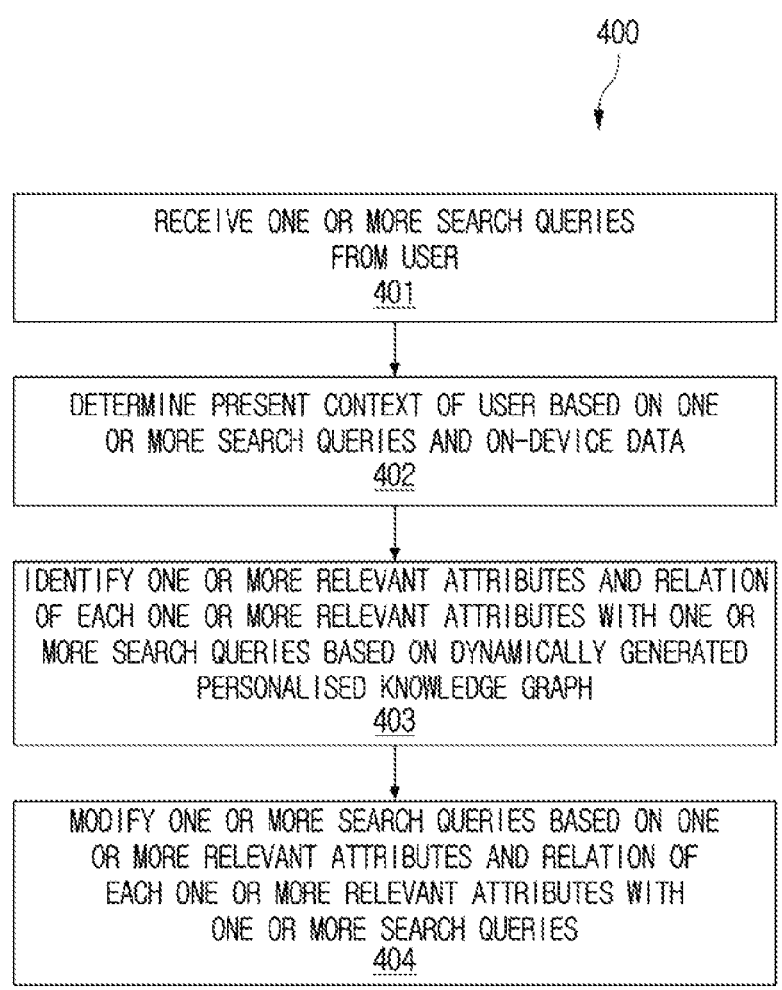
FIG. 4 illustrates a flowchart of a method for modifying a search query for a user, in accordance with certain embodiments of present disclosure.

FIG. 4 illustrates a flowchart of a method for modifying a search query for a user, in accordance with some embodiments of present disclosure.

As illustrated in FIG. 4, the method 400 may include one or more blocks for executing processes in the modification system 101. The method 400 may be described in the general context of computer executable instructions. Generally, computer executable instructions can include routines, programs, objects, components, data structures, procedures, modules, and functions, which perform particular functions or implement particular abstract data types.

The order in which the method 400 are described may not intended to be construed as a limitation, and any number of the described method blocks can be combined in any order to implement the method. Additionally, individual blocks may be deleted from the methods without departing from the scope of the subject matter described herein. Furthermore, the method can be implemented in any suitable hardware, software, firmware, or combination thereof.

At block 401, the information reception module 201 may be configured to receive one or more search queries from a user. The search query may be for example, "show family pictures".

At block 402, upon receiving the search query, the present context determination module 202 may determine present context of the user based on the one or more search queries entered by the user and on-device data. The one-device data comprises sensor data, settings in the device, activity information, event information, contacts information, application settings information, application sensor information and current location of the user. Considering the above example, the present context may be determined as "see pictures of family member".

At block 403, upon determining the present context of the user 102, the relevant attribute and relation identification module 203 may identify one or more relevant attributes and relation of each of the one or more relevant attributes with the one or more search queries. The one or more relevant attributes and relation are identified based on the present context of the user 102 and the PKG.

Figure 5:
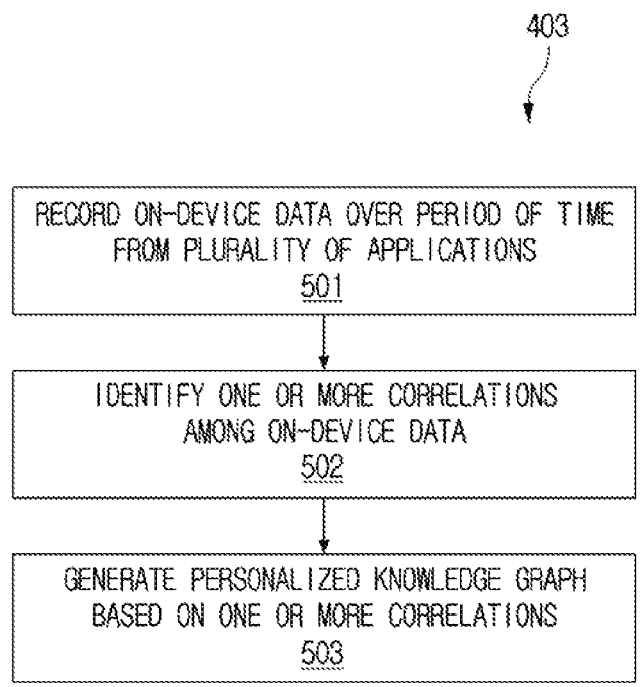
FIG. 5 illustrates a flowchart of a method for generating a personalized knowledge graph for modifying a search query for a user, in accordance with certain embodiments of present disclosure.

FIG. 5 shows a flowchart for generating the personalized knowledge graph based on the on-device data, according to embodiments of the disclosure.

At block 501, the personalized knowledge graph generation module 204 may be configured to record the on-device data over a period of time from the plurality of applications. The plurality of applications may include, but is not limited to, an application for booking movie tickets, an application for ordering grocery, an application for ordering food, social media applications, an application for storing pictures, and so on.

At block 502, upon recording the on-device data, the personalized knowledge graph generation module 204 may identify one or more correlations among the on-device data. The on-device data is obtained from the plurality of applications associated with the user 102.

At block 503, upon identifying the one or more correlations, the personalized knowledge graph generation module 204 may generate the personalized knowledge graph based on the one or more correlations which are obtained from the on-device data.

In an embodiment, the personalized knowledge graph generation module 204 may detect any new information entered provided by the user 102. For example, the new information may include, but is not limited to, a new photo, a new contact number, a new post on social media, and so on. Upon detecting the new information, the personalized knowledge graph generation module 204 may dynamically update the generated personalized knowledge graph with the new information.

Referring back to FIG. 4, at block 404, upon identification of the one or more relevant attributes and relation, the search query modification module 205 may be configured to modify the one or more search queries. For example, the search query "show family pictures" may be modified as "show family pictures of previous year new year party" based on the generated personalized knowledge graph and context of the user 102. In another scenario, the search query may a be modified as "show family pictures of mom and dad" as a calendar present in the device of the user 102 may indicate a wedding anniversary of the parents of the user 102. Thus, the user 102 may be wishing to see such pictures for posting.

Figure 6:
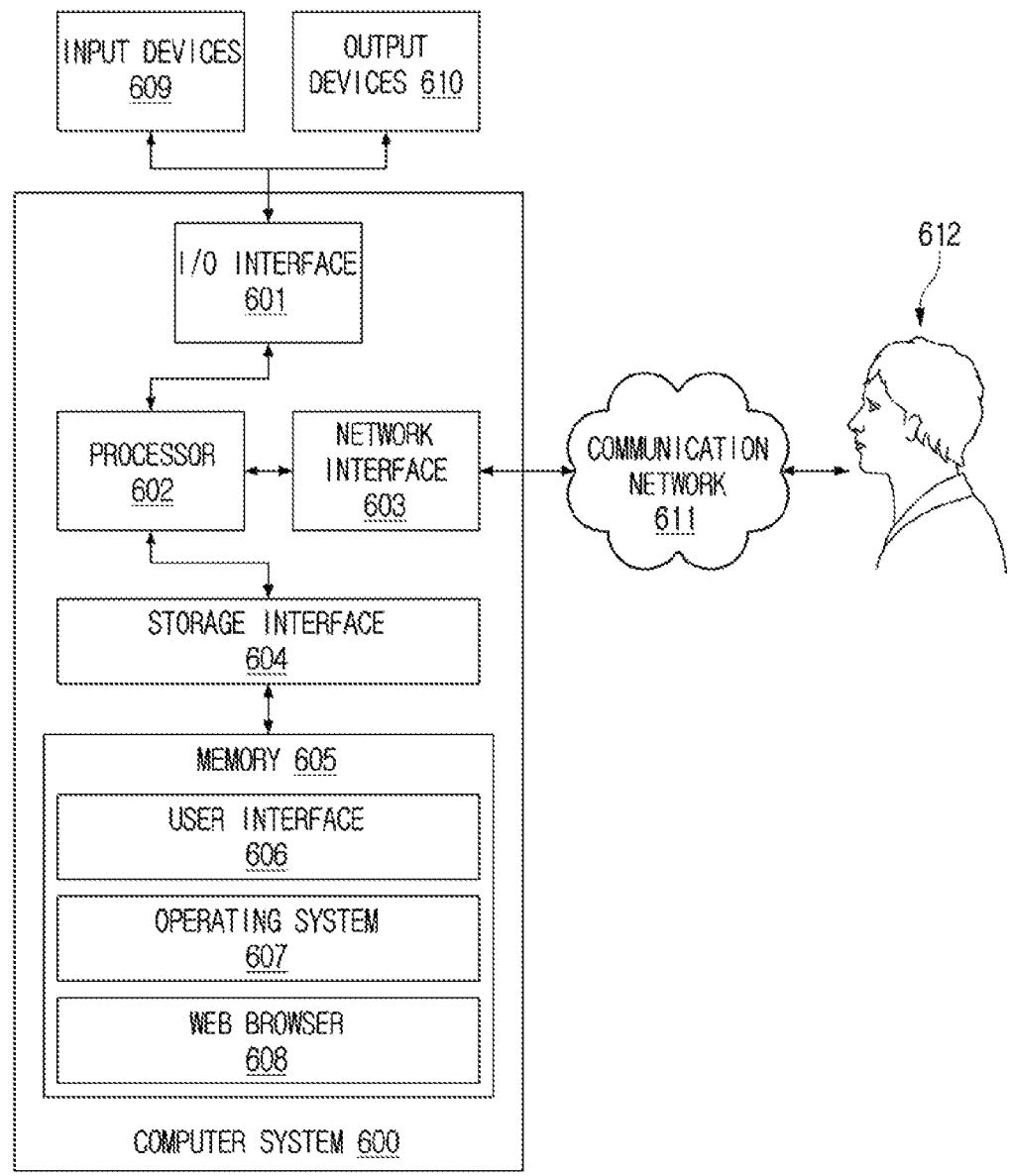
FIG. 6 illustrates a block diagram of a computer system for implementing embodiments consistent with the present disclosure.

FIG. 6 illustrates a block diagram of a computer system 600 for implementing embodiments consistent with the present disclosure. In an embodiment, the computer system 600 is used to implement the modification system 101. The computer system 600 may include a central processing unit ("CPU" or "processor") 602. The processor 602 may include at least one data processor for executing processes in Virtual Storage Area Network. The processor 602 may include specialized processing units such as integrated system (bus) controllers, memory management control units, floating point units, graphics processing units, digital signal processing units, etc.

The processor 602 may be disposed in communication with one or more input/output (I/O) devices 609 and 610 via I/O interface 601. The I/O interface 601 may employ communication protocols/methods such as, without limitation, audio, analog, digital, monaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.n/b/g/n/x, Bluetooth, cellular (e.g., code-division multiple access (CDMA), high-speed packet access (HSPA+), global system for mobile communications (GSM), long-term evolution (LTE), WiMax, or the like), etc.

Using the I/O interface 601, the computer system 600 may communicate with one or more I/O devices 609 and 610. For example, input devices 609 may be an antenna, keyboard, mouse, joystick, (infrared) remote control, camera, card reader, fax machine, dongle, biometric reader, microphone, touch screen, touchpad, trackball, stylus, scanner, storage device, transceiver, video device/source, etc. Output devices 610 may be a printer, fax machine, video display (e.g., cathode ray tube (CRT), liquid crystal display (LCD), light-emitting diode (LED), plasma, Plasma display panel (PDP), Organic light-emitting diode display (OLED) or the like), audio speaker, etc.

In some embodiments, the computer system 600 may include the modification system 101.

The processor 602 may be disposed in communication with one or more communication networks 611 via a network interface 603. The network interface 603 may communicate with the communication network 611. The network interface 603 may employ connection protocols including, without limitation, direct connect, Ethernet (e.g., twisted pair 10/100/1000 Base T), transmission control protocol/internet protocol (TCP/IP), token ring, IEEE 802.11a/b/g/n/x, etc. The communication network 611 may include, without limitation, a direct interconnection, local area network (LAN), wide area network (WAN), wireless network (e.g., using Wireless Application Protocol), the Internet, etc. Using the network interface 603 and the communication network 611, the computer system 600 may communicate with user 612 for modifying a search query for the user 612. The network interface 603 may employ connection protocols including, but not limited to, direct connect, Ethernet (e.g., twisted pair 10/100/1000 Base T), transmission control protocol/internet protocol (TCP/IP), token ring, IEEE 802.11a/b/g/n/x, etc.

The communication network 611 may include, but is not limited to, a direct interconnection, an e-commerce network, a peer to peer (P2P) network, local area network (LAN), wide area network (WAN), wireless network (e.g., using Wireless Application Protocol), the Internet, Wi-Fi, and such. In certain embodiments, a first network and a second network may be present, and each may either be a dedicated network or a shared network, which represents an association of the different types of networks that use a variety of protocols, for example, Hypertext Transfer Protocol (HTTP), Transmission Control Protocol/Internet Protocol (TCP/IP), Wireless Application Protocol (WAP), etc., to communicate with each other. Further, the first network and the second network may include a variety of network devices, including routers, bridges, servers, computing devices, storage devices, etc.

In some embodiments, the processor 602 may be disposed in communication with a memory 605 (e.g., RAM, ROM, etc. not shown in FIG. 6) via a storage interface 604. The storage interface 604 may connect to memory 605 including, without limitation, memory drives, removable disc drives, etc., employing connection protocols such as, serial advanced technology attachment (SATA), Integrated Drive Electronics (IDE), IEEE-1394, Universal Serial Bus (USB), fibre channel, Small Computer Systems Interface (SCSI), etc. The memory drives may further include a drum, magnetic disc drive, magneto-optical drive, optical drive, Redundant Array of Independent Discs (RAID), solid-state memory devices, solid-state drives, etc.

The memory 605 may store a collection of program or database components, including, without limitation, user interface 606, an operating system 607, etc. In some embodiments, computer system 600 may store user/application data 606, such as, the data, variables, records, etc., as described in this disclosure. Such databases may be implemented as fault-tolerant, relational, scalable, secure databases such as Oracle® or Sybase®.

The operating system 607 may facilitate resource management and operation of the computer system 600. Examples of operating systems include, without limitation, APPLE MACINTOSH® OS X, UNIX®, UNIX-like system distributions (E.G., BERKELEY SOFTWARE DISTRIBUTION™ (BSD), FREEBSD™, NETBSD™, OPENBSD™, etc.), LINUX DISTRIBUTIONS™ (E.G., RED HAT™, UBUNTU™, KUBUNTU™, etc.), IBM™ OS/2, MICROSOFT™ WINDOWS™ (XPTM, VISTA™, 7, 8, 10, etc.), APPLE® IOS™, GOOGLE® ANDROID™, BLACKBERRY® OS, or the like.

Furthermore, one or more non-transitory computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include Random Access Memory (RAM), Read-Only Memory (ROM), volatile memory, non-volatile memory, hard drives, CD ROMs, DVDs, flash drives, disks, and any other known physical storage media.

An embodiment of the present disclosure provisions a method for modifying the search query entered by the user for providing better results to the user by using the personalized knowledge graph for modification.

One or more embodiments of the present disclosure provide a method to better understand the search query and the present context of the user by using the on-device data and the personalized knowledge graph related to the user.

One or more embodiments of the present disclosure may improve performance of the device while providing search results to a search query by efficiently modifying the search query to understand intent of the user and providing relevant results for the search query.

The described operations may be implemented as a method, system, or article of manufacture using standard programming and/or engineering techniques to produce software, firmware, hardware, or any combination thereof. The described operations may be implemented as code maintained in a "non-transitory computer readable medium", where a processor may read and execute the code from the computer readable medium. The processor is at least one of a microprocessor and a processor capable of processing and executing the queries. A non-transitory computer readable medium may include media such as magnetic storage medium (e.g., hard disk drives, floppy disks, tape, etc.), optical storage (CD-ROMs, DVDs, optical disks, etc.), volatile and non-volatile memory devices (e.g., EEPROMs, ROMs, PROMs, RAMs, DRAMs, SRAMs, Flash Memory, firmware, programmable logic, etc.), etc. Further, non-transitory computer-readable media may include any computer-readable media except for transitory media. The code implementing the described operations may further be implemented in hardware logic (e.g., an integrated circuit chip, Programmable Gate Array (PGA), Application Specific Integrated Circuit (ASIC), etc.).

An "article of manufacture" includes non-transitory computer readable medium, and/or hardware logic, in which code may be implemented. A device in which the code implementing the described embodiments of operations is encoded may include a computer readable medium or hardware logic. Of course, those skilled in the art will recognize that many modifications may be made to this configuration without departing from the scope of the invention, and that the article of manufacture may include suitable information bearing medium known in the art.

The terms "an embodiment", "embodiment", "embodiments", "the embodiment", "the embodiments", "one or more embodiments", "some embodiments", and "one embodiment" mean "one or more (but not all) embodiments of the invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an", and "the" mean "one or more", unless expressly specified otherwise.

A description of an embodiment with several components in communication with each other does not imply that all such components are required. On the contrary, a variety of optional components are described to illustrate the wide variety of possible embodiments of the invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article, or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

The illustrated operations of FIG. 4 shows certain events occurring in a certain order. In alternative embodiments, certain operations may be performed in a different order, modified, or removed. Moreover, operations may be added to the above-described logic and still conform to the described embodiments. Further, operations described herein may occur sequentially or certain operations may be processed in parallel. Yet further, operations may be performed by a single processing unit or by distributed processing units.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the disclosure of the embodiments of the invention is intended to be illustrative, but not limiting, of the scope of the invention, which is set forth in the following claims.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A query processing method for modifying a search query for a user, the query processing method comprising, by at least one processor:
receiving at least one search query from a user;
determining a present context of the user, based on the at least one search query and on-device data obtained from a plurality of applications of at least one device of the user;
dynamically generating a personalized knowledge graph by:
obtaining the on-device data by recording the on-device data over a period of time from the plurality of applications;
identifying at least one correlation among the on-device data from the plurality of applications; and
generating the personalized knowledge graph based on the at least one correlation obtained among the on-device data;
identifying at least one relevant attribute related to the search query based on the present context of the user and the personalized knowledge graph;
modifying the search query, based on the at least one relevant attribute and a relation of the at least one relevant attribute with the search query, to obtain at least one modified search query; and providing results for the search query by applying the at least one modified search query to a search.

2. The query processing method as claimed in claim 1, further comprising:

ranking the at least one modified search query, based on a relevance confidence determined for the at least one relevant attribute and the relation of each of the at least one relevant attribute associated with the at least one modified search query, wherein the relevance confidence is determined based on the present context of the user and the on-device data; and providing the at least one modified search query and at least one search result for the at least one modified search query to the user.

3. The query processing method as claimed in claim 2, wherein a plurality of modified search queries are obtained, and wherein the at least one search result is related to a modified search query ranked highest among the plurality of modified search queries based at least in part on the relevance confidence.

4. The query processing method as claimed in claim 1, further comprising:

detecting at least one new information from a device related to the user; and updating the personalized knowledge graph for each detection of the at least one new information in the device.

5. The query processing method as claimed in claim 1, wherein the on-device data comprises at least one of on-device sensor data, on-device settings of the user, user activity information, user event information, user contacts information, user application settings information, application sensor information, and current location information of user.

6. A query modification and processing system for modifying a search query for a user, the system comprising:

a memory storing instructions;

a processor communicatively coupled to the memory and configured to execute the instructions to:

receive at least one search query from a user;

determine a present context of the user, based on the at least one search query and on-device data obtained from a plurality of applications of at least one device of the user;

dynamically generate a personalized knowledge graph by:

obtaining the on-device data by recording the on-device data over a period of time from the plurality of applications;

identifying at least one correlation among the on-device data from the plurality of applications; and generating the personalized knowledge graph based on the at least one correlation obtained among the on-device data;

identify at least one relevant attribute related to the at least one search query based on the present context of the user and the personalized knowledge graph;

modify the at least one search query, based on the at least one relevant attribute and a relation of the at least one relevant attribute with the at least one search query, to obtain at least one modified search query; and provide results for the search query by applying the at least one modified search query to a search.

7. The query modification and processing system as claimed in claim 6, wherein the processor is further configured to execute the instructions to:

rank the at least one modified search query, based on a relevance confidence determined for the at least one relevant attribute and the relation of each of the at least one relevant attribute associated with the at least one modified search query, wherein the relevance confidence is determined based on the present context of the user and the on-device data; and provide the at least one modified search query and at least one search result for the at least one modified search query to the user.

8. The query modification and processing system as claimed in claim 7, wherein a plurality of modified search queries are obtained, and wherein the at least one search result is related to a modified search query ranked highest among the plurality of modified search queries based at least in part on the relevance confidence.

9. The query modification and processing system as claimed in claim 6, wherein the processor is further configured to execute the instructions to:

detect at least one new information from a device related to the user; and update the personalized knowledge graph for each detection of new information in the device.

10. The query modification and processing system as claimed in claim 6, wherein the on-device data comprises at least one of on-device sensor data, on-device settings of the user, user activity information, user event information, user contacts information, user application settings information, application sensor information, and current location information of user.

11. An on-device search query processing method for providing results for a search query for a user, the on-device search query processing method comprising, by at least one processor:

receiving at least one search query from the user;

determining a current context of the user, wherein the current context of the user comprises at least one of an application activity, a location of the user, on-device sensor data, and on-device settings of the user;

dynamically generating a personalized knowledge graph by:

obtaining on-device data by recording the on-device data over a period of time from a plurality of applications;

identifying at least one correlation among the on-device data from the plurality of applications; and generating the personalized knowledge graph based on the at least one correlation obtained among the on-device data;

referring to the personalized knowledge graph to identify at least one relevant relationship relevant to the search query, from among a plurality of relationships established between the current context of the user and a past context of the user;

modifying the search query, based on the at least one relevant relationship, to obtain at least one modified search query, to obtain a modified search query; and providing results for the search query by applying the modified search query to a search.

12. The on-device search query processing method as claimed in claim 11, wherein the personalized knowledge graph is generated using at least one of the past context of the user, past application activity, a past location of the user, past on-device sensor data, and past on-device settings of the user.

13. A search query processing method for providing results for a search query for a user, the search query processing method comprising, by at least one processor:
receiving a search query from a user;
identifying a current context of the search query, based on at least one of an application activity, a location of the user, on-device sensor data, and on-device settings of the user;
extracting at least one entity from the search query, wherein the at least one entity comprises at least one of a name, a tag, and a media;
dynamically generating a personalized knowledge graph by:
obtaining on-device data by recording the on-device data over a period of time from a plurality of applications;
identifying at least one correlation among the on-device data from the plurality of applications; and
generating the personalized knowledge graph based on the at least one correlation obtained among the on-device data;
referring to the personalized knowledge graph to identify a relevant relationship between the at least one entity and the current context of the search query;
extracting information related to the at least one entity based on the identified relevant relationship;
generating at least one expanded search query based on the location, the current context, the information related to the at least one entity, and the relevant relationship;
selecting a selected expanded search query having maximum relevance to the current context of the search query among the at least one expanded search query; and
providing search results for the selected expanded search query.

\* \* \* \* \*